United States Patent [19]

Gately

[11] 4,390,337
[45] Jun. 28, 1983

[54] APPARATUS HAVING AN AUTOMATIC FOAM DISPENSING SYSTEM FOR FORMING SHOCK-ABSORBING MEMBERS IN A CONTAINER

[75] Inventor: Dana R. Gately, San Clemente, Calif.

[73] Assignee: Sealed Air Corporation, Fair Lawn, N.J.

[21] Appl. No.: 324,456

[22] Filed: Nov. 24, 1981

[51] Int. Cl.³ .................. B29D 27/04; B29C 1/04; B29C 5/00; B29C 7/00

[52] U.S. Cl. .................. 425/89; 264/39; 264/46.4; 264/46.6; 264/334; 264/338; 425/120; 425/127; 425/159; 425/226; 425/443; 425/817 R

[58] Field of Search .................. 264/54, 46.4, 46.5, 264/46.6, 334, 338, 39; 425/127, 89, 120, 159, 226, 443, 817 R

[56] References Cited

U.S. PATENT DOCUMENTS

| | | | |
|---|---|---|---|
| 2,448,786 | 9/1948 | Faxon | 425/89 X |
| 2,979,246 | 4/1961 | Liebeskind | 264/46.4 X |
| 3,166,227 | 1/1965 | Ragnow | 264/46.4 X |
| 3,204,385 | 9/1965 | De Remer et al. | 264/46.5 X |
| 3,325,861 | 6/1967 | Pincus et al. | 425/89 |
| 3,485,347 | 12/1969 | McGill et al. | 264/46.5 X |
| 3,503,177 | 3/1970 | Kropscott et al. | 264/46.5 X |
| 3,692,442 | 9/1972 | Gerbert | 264/39 X |
| 3,814,780 | 6/1974 | Woodhall | 264/54 |
| 4,002,289 | 1/1977 | Moore | 264/46.4 X |
| 4,051,209 | 9/1977 | Tabler | 264/46.5 X |
| 4,073,664 | 2/1978 | Zwirlein | 264/39 X |
| 4,196,160 | 4/1980 | Sperry | 264/40.4 |

Primary Examiner—Philip E. Anderson
Attorney, Agent, or Firm—Lerner, David, Littenberg, Krumholz & Mentlik

[57] ABSTRACT

An automatic foam dispensing system is described for forming shock-absorbing members of synthetic foamed material into predetermined shapes at pre-selected locations inside a container for the cushioning of articles to be provided therein. The foam dispensing system is generally constructed from a dispensing booth having a plurality of synthetic foam dispensing apparatus provided thereat and a plurality of mold assembles adapted for movement along a track to and from the dispensing booth.

16 Claims, 15 Drawing Figures

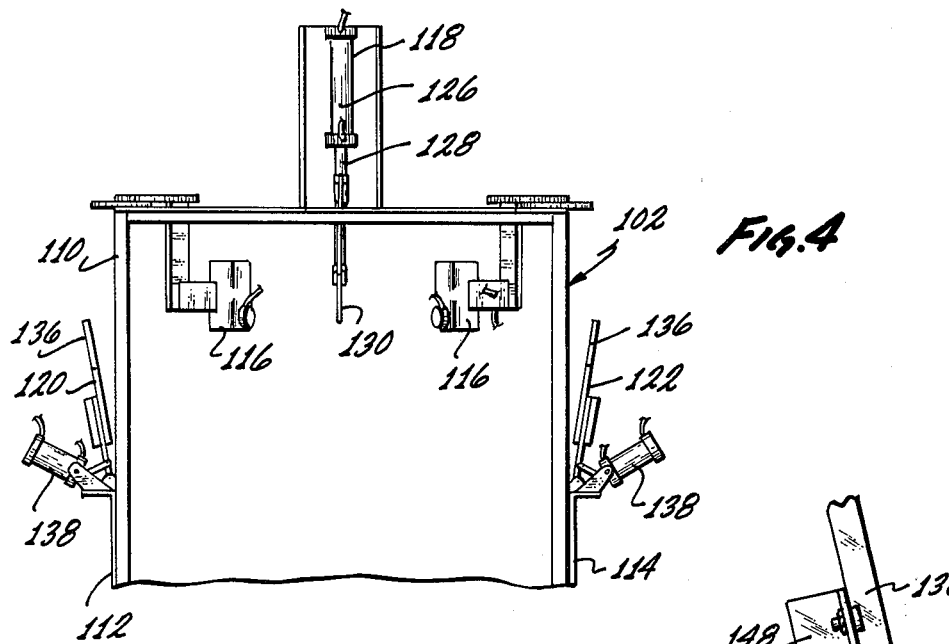
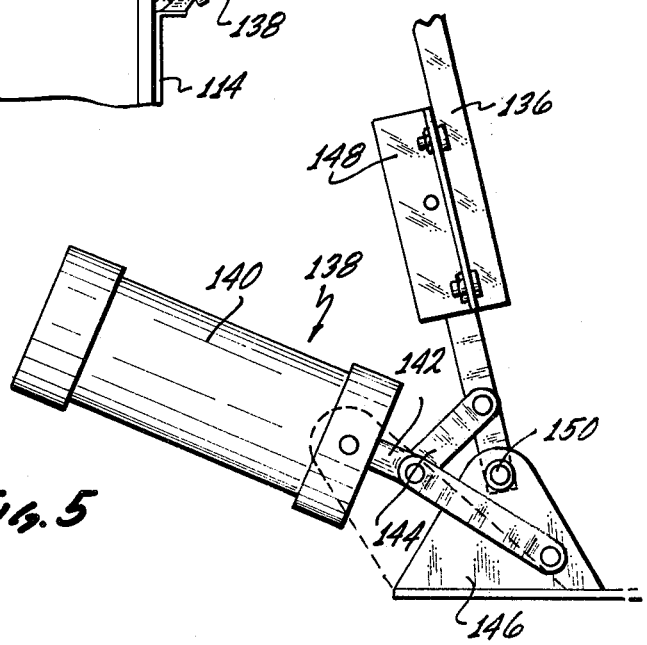
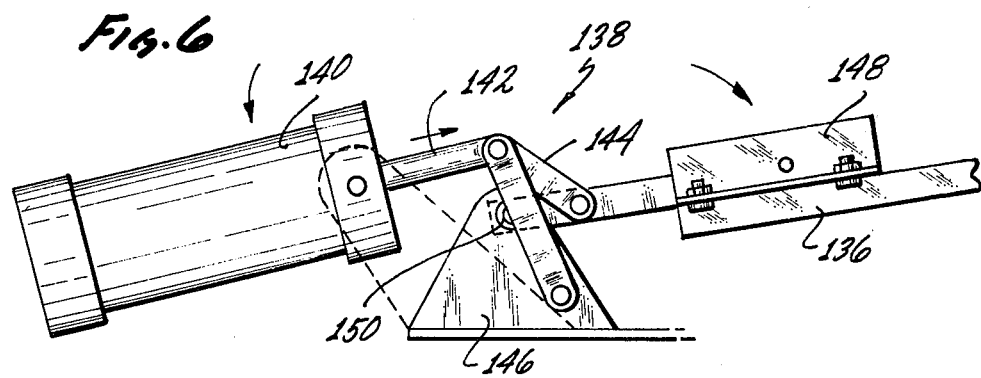

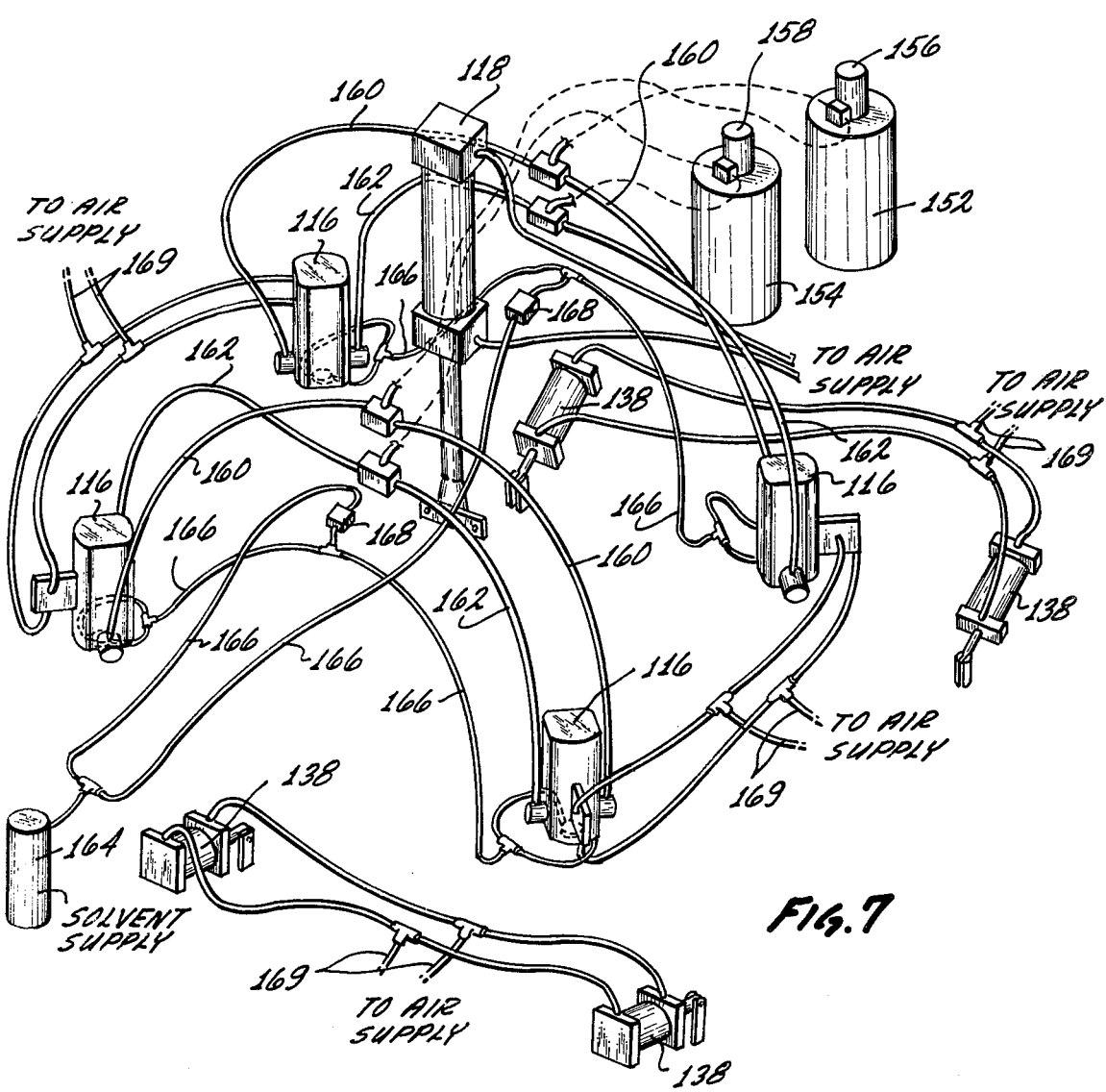

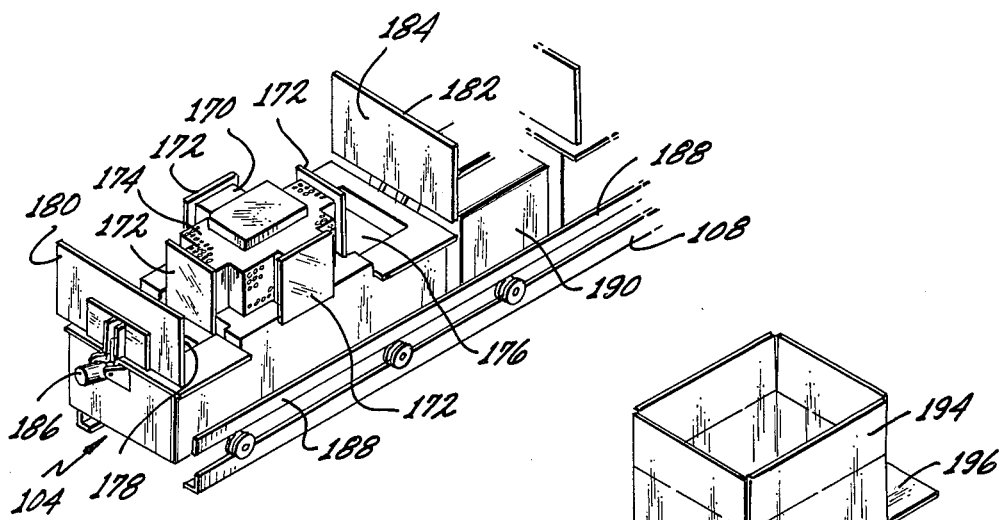
Fig. 8
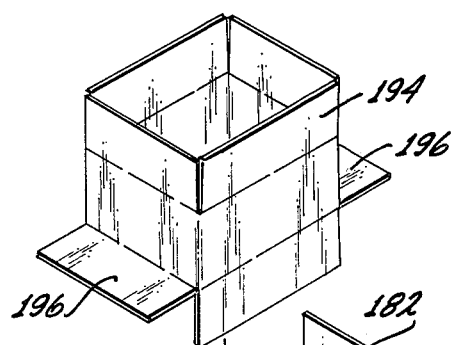
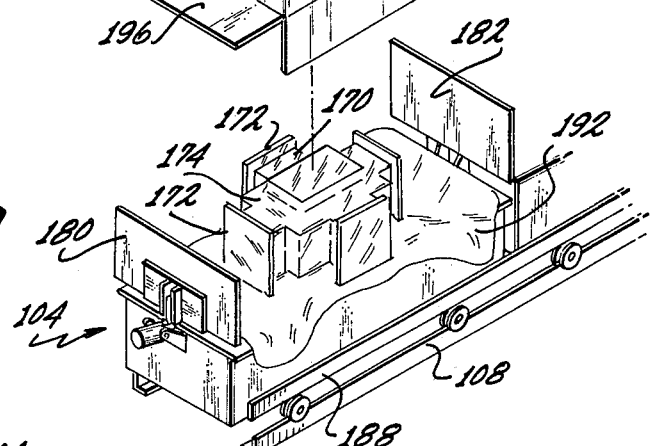
Fig. 9
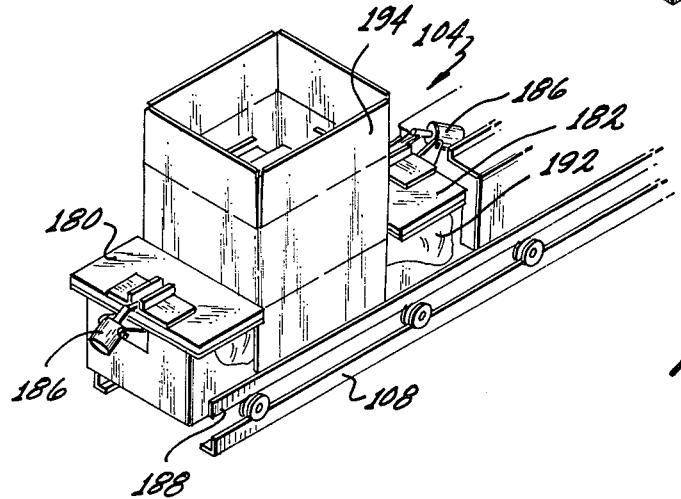
Fig. 10

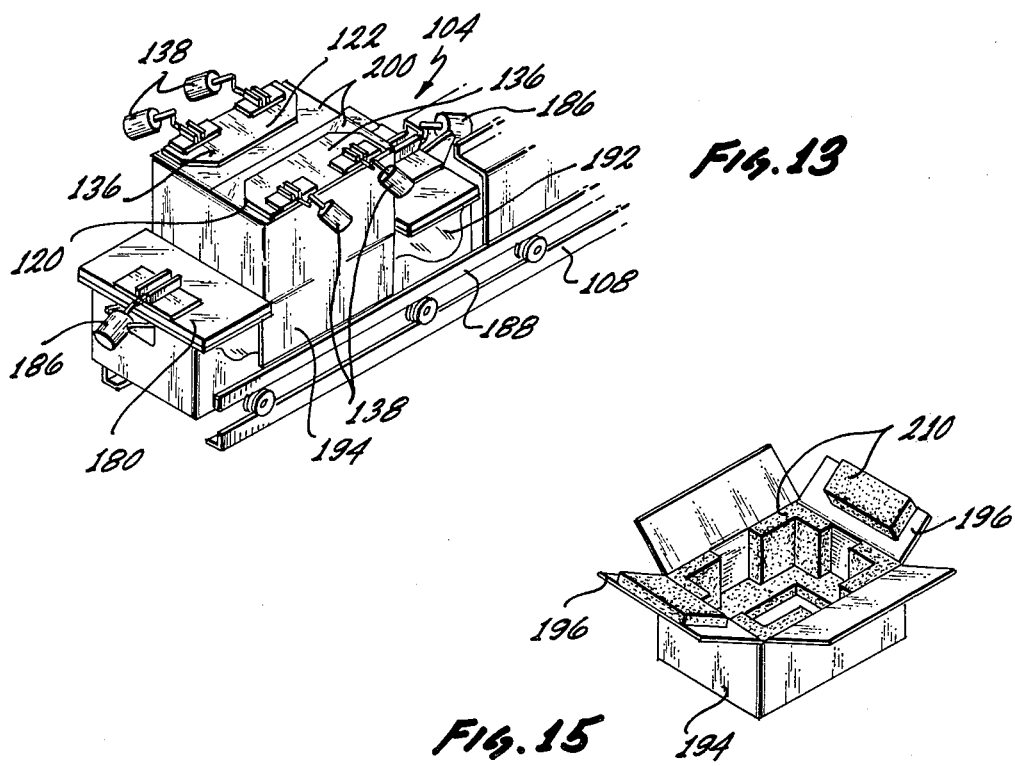
Fig. 13
Fig. 15
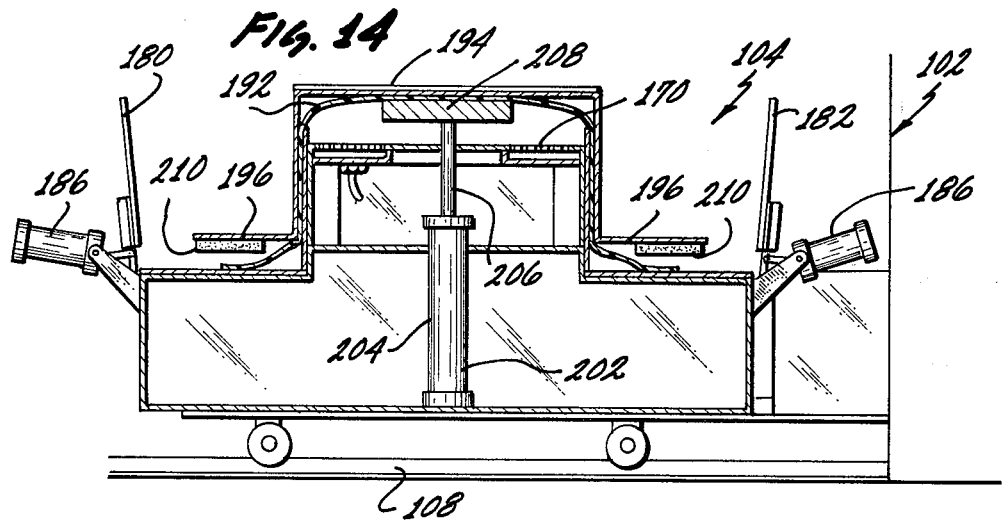
Fig. 14

APPARATUS HAVING AN AUTOMATIC FOAM DISPENSING SYSTEM FOR FORMING SHOCK-ABSORBING MEMBERS IN A CONTAINER

BACKGROUND OF THE INVENTION

The present invention relates in general to an apparatus for forming shock-absorbing members of synthetic material inside a container, and more particularly, to an automatic system for forming shock-absorbing members of synthetic foamed material into predetermined shapes at pre-selected locations inside a container for the cushioning of an article to be provided therein.

As is known to those skilled in the art, the preparation of many synthetic foamed materials, such as polyurethane foamed material, requires uniform mixing of liquid organic resins with polyisocyanates in a so-called mixing chamber of a dispensing apparatus. One such dispensing apparatus for the discharging of synthetic foamed material is disclosed in U.S. patent application Ser. No. 298,456, filed on Sept. 2, 1981 and assigned to the same assignee of the present invention, which dispensing apparatus is incorporated by reference herein. In regard to such dispensing apparatus, it has been considered desirable, but never commercially feasible, to incorporate the dispensing apparatus into an automatic system for forming shock-absorbing members of such polyurethane foamed material into predetermined shapes at pre-selected locations inside a container for the cushioning of an article to be provided therein during a packaging operation.

In accordance with one known prior art apparatus, there is known a mold assembly for manually forming shock-absorbing members of polyurethane material into predetermined shapes at pre-selected locations inside a packaging container. Specifically, the mold assembly includes a male mold for forming the polyurethane material into such shapes at such locations within the container. The container, having an open top and bottom, is placed over the mold and secured to the mold assembly by engagement with the container's end flaps. A process operator manually dispenses the polyurethane foam from a single hand-held dispensing apparatus into the container through its open bottom in order to surround the mold and fill the voids formed between the mold and the walls of the container. Once the container has been filled to approximately three-quarters of its capacity with the polyurethane foam, the process operator terminates the dispensing operation. At such time, the process operator closes the end and side flaps along the bottom of the container while allowing the polyurethane foam to expand upwardly into the unfilled voids. After the polyurethane foam has completely expanded, the process operator seals the bottom of the box and removes it from the mold assembly.

In application of the prior art mold assembly by the process operator in a manual operation, a number of disadvantages result therefrom. Specifically, the process operator often overfills the container with polyurethane foam causing such foam during its expansion to either rupture the container walls or to cause partial collapse of the foam due to its restricted confinement within the container. In either event, the partial collapse of the polyurethane foam or rupturing of the container renders the formed shock-absorbing members and container unsuitable for use, along with the associated economic loss. In addition, the polyurethane foam, under such circumstances, often spills onto and fouls the mold assembly requiring that it be thoroughly cleaned before continued use. The process operator is further found to often cause spilling of the polyurethane foam on the outside of the container itself which renders such container unsuitable for customer use and on the floor which requires a further time-consuming and costly clean-up operation. Further still, it has been found that the process operator often drops the dispensing apparatus when closing and sealing the bottom of the container such that the dispensing apparatus is often damaged. In addition, the continued movement of the heated organic resin and polyisocyanate supply lines often results in high maintenance and frequent replacement thereof as such movement and flexing causes their ultimate cracking or rupturing during continued use.

Accordingly, it can be appreciated that there is an unsolved need for an automatic foam dispensing system for forming shock-absorbing members of synthetic foamed material into predetermined shapes at preselected locations inside a container for the cushioning of an article to be provided therein in such a manner so as to remove the dispensing apparatus from the hands of the process operator.

SUMMARY OF THE INVENTION

It is broadly an object of the present invention to provide an automatic foam dispensing system which fulfills one or more of the foregoing requirements for such a system and which avoids or overcomes one or more of the foregoing disadvantages from the use of the prior art manually-operated mold assembly as noted above. Specifically, it is within the contemplation of the present invention to provide an automatic foam dispensing system for forming shock-absorbing members of polyurethane foam into predetermined shapes at preselected locations inside a container for the cushioning of an article to be provided therein.

A further object of the present invention is to provide an automatic foam dispensing system which eliminates the need for a process operator to manually dispense the polyurethane foam from a dispensing apparatus into the container.

A still further object of the present invention is to provide an automatic foam dispensing system which can be operated at increased speed while maintaining quality control of the shock-absorbing members formed within the container.

A still further object of the present invention is to provide an automatic foam dispensing system which prevents the inadvertent overfilling of the container which results in the foregoing disadvantages.

A still further of the present invention is to provide an automatic foam dispensing system which is economical to use in a fast and efficient manner.

In accordance with one embodiment of the present invention, there is provided a system for forming shock-absorbing members of cushioning material inside a container for the cushioning of an article to be provided therein. The system comprises a mold assembly adapted to be movable between a first and second position and to securely receive thereon a container having an opening therein, means for moving the mold assembly between the first and second position, means at the second position for dispensing the cushioning material into the container through the opening when the mold assembly is in the second position, means at the second position for closing the opening of the container, and means in association with the mold assembly for separating the container from the mold assembly when the mold assembly is in the first position, wherein the container has formed therein the shock-absorbing members of the cushioning material.

Further in accordance with the above embodiment, the means for moving the mold assembly between the first and second position is constructed and arranged for movement of the mold assembly along either a substantially linear path or a substantially closed path.

Still further in accordance with the above embodiment, the dispensing means and closing means are secured to a booth located at the second position, such booth arranged for receiving the mold assembly when moved from the first position to the second position.

Yet still further in accordance with the above embodiment, the means for closing the opening of the container comprises a pair of arms pivotly arranged at the second position for engagement with the end flaps of the container and a pair of projections pivotly arranged at opposite sides of the second position for engagement with the side flaps of the container.

BRIEF DESCRIPTION OF THE DRAWINGS

The above description, as well as further objects, features and advantages of the present invention, will be more fully understood by reference to the following detailed description of a presently preferred, but nonetheless illustrative, automatic foam dispensing system in accordance with the present invention when taken in conjunction with the accompanying drawings, wherein:

FIG. 4 is an end elevation of the booth as shown in FIG. 1 showing the further relationship between the foam dispensing apparatus and the means for closing the end and bottom flaps of the bottom of the container;

FIGS. 5 and 6 are side elevations showing the construction of the mechanism used in operation of the securing means for securing the container to the mold assembly and the closing means for closing the side flaps on the bottom of the container;

FIG. 7 is a perspective view of the organic resin and polyisocyante supply lines, the air supply lines, and the solvent supply lines as connected to the automatic foam dispensing system as shown in FIG. 1; and FIGS. 8-14 are perspective views showing the operation of the automatic foam dispensing system in forming shock-absorbing members of synthetic foamed material into predetermined shapes at pre-selected locations inside a container for the cushioning of an article to be provided therein.

FIG. 15 is a perspective view of container having a plurality of polyurethane foam shock-absorbing members.

DETAILED DESCRIPTION

Figure 1:
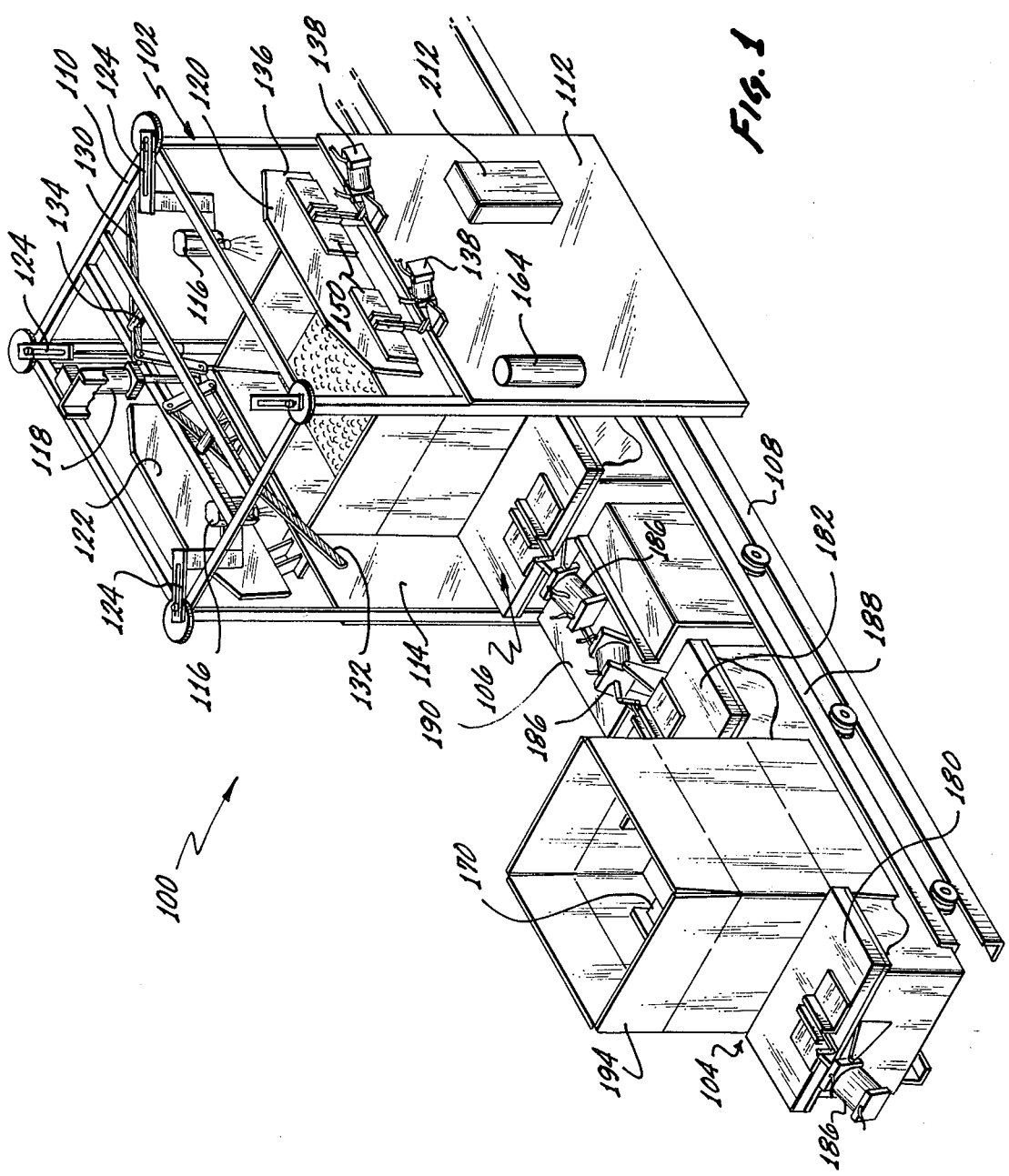
FIG. 1 is a perspective view of an automatic foam dispensing system constructed from a booth, a mold assembly, and means for moving the mold assembly to and from the booth.

Referring now to the drawings in which like reference characters represent like elements, there is shown in FIG. 1 an automatic foam dispensing system designated generally by reference character 100. The dispensing system 100 is generally constructed to include a dispensing booth 102, one or more mold assemblies 104, 106 and a track assembly 108. In general, the dispensing booth 102 is constructed from a metal frame 110 having a front and rear enclosure plate 112, 114 arranged such that the sides of the dispensing booth remain unobstructed for receiving therein a mold assembly 104, 106 along the track assembly 108.

Figure 2:
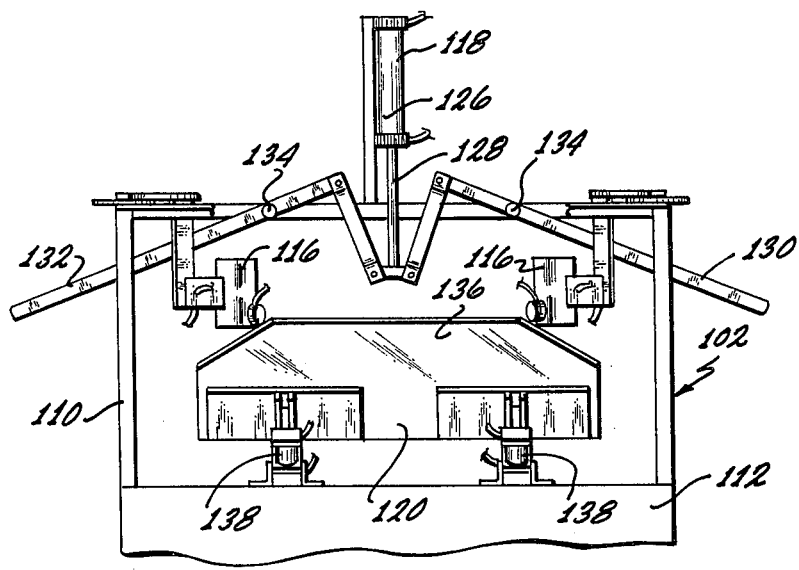
FIG. 2 is a side elevation of the booth as shown in FIG. 1 having a top frame section removed showing means for closing the side and end flaps of the bottom of the container when positioned therein.
Figure 3:
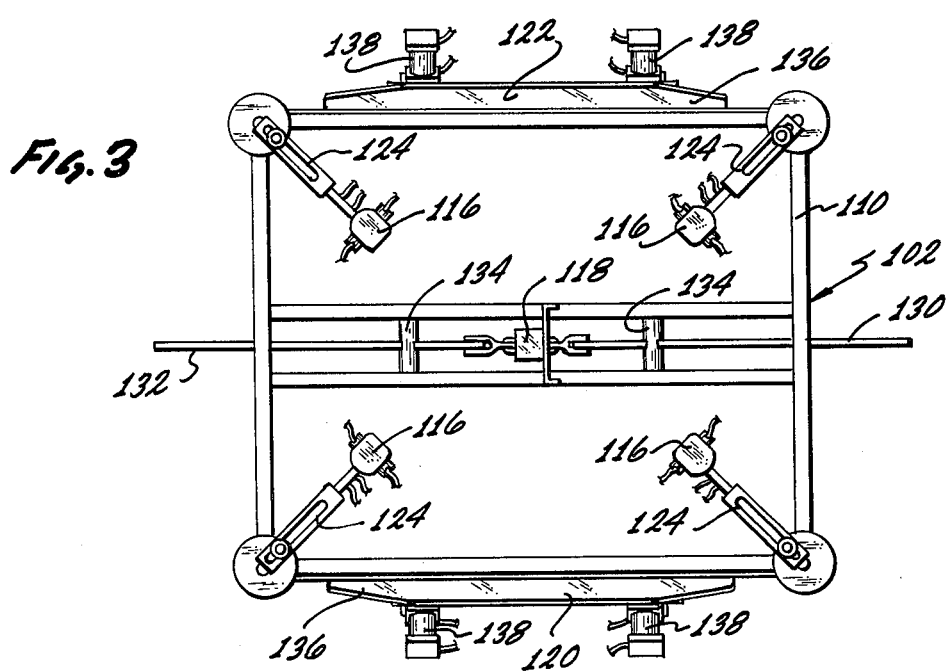
FIG. 3 is a top elevation of the booth as shown in FIG. 1 showing the location of the polyurethane foam dispensing apparatus at the corners thereof.

Referring specifically to FIGS. 2-4, the dispensing booth 102 is constructed to include a plurality of polyurethane foam dispensing apparatus 116, a single arm assembly 118 and a pair of projection assemblies 120, 122. A polyurethane foam dispensing apparatus 116 of the type described in the above-mentioned patent application is adjustably secured at each corner of the dispensing booth 102. Each dispensing apparatus 116 is adjustably secured to the dispensing booth 102 by a slotted bar and bolt assembly 124. In this regard, the position of each dispensing apparatus 116 is adjusted and aligned with respect to the dimensions and shape of the container to be filled with polyurethane foam. In an embodiment not shown, each dispensing apparatus 116 may be mounted to a fixture which allows movement of the dispensing apparatus over the container or a portion thereof in a programmed manner. The fixture can be constructed of an assembly known to those skilled in the art, such as that disclosed in U.S. Pat. No. 4,196,160, which is incorporated by reference herein.

The arm assembly 118 is constructed from a fluid cylinder 126 having a piston rod 128 at one end thereof. The free end of the piston rod 128 is pivotally connected to one end of a pair of arms 130, 132. The arms 130, 132 are pivotally connected to the frame 110 of the dispensing booth 102 by a pivot bearing 134. The arm assembly 118 is secured generally to the top portion of the frame 110 overlying a central location of the dispensing booth 102 such that the arms 130, 132 are in longitudinal axial alignment with the dispensing system 100.

The projection assemblies 120, 122 are each constructed from a projection 136 pivotally secured to the front and rear enclosure plates 112, 114 by a pair of pivot assemblies 138. The construction and operation of the pivot assembly 138 is illustrated in FIGS. 5 and 6. As the pivot assembly 138 is considered well-known to those skilled in the art, the construction thereof will only be briefly described as other such pivot assemblies may be incorporated into the present invention without departing from the spirit and scope thereof. Specifically with reference to FIGS. 5 and 6, the pivot assembly 138 is constructed from a fluid cylinder 140 having a piston rod 142 at one end thereof. The free end of the piston rod 142 is pivotally secured to a linkage assembly 144 which in turn is pivotally secured to a support bracket 146 and projection 136 by pivoting bracket 148. The in-and-out movement of the piston rod 142 by the fluid cylinder 140 causes pivotal movement of the projection 136 due to it being pivotally secured to the support bracket 146 at pivot point 150 via the pivoting bracket 150.

Referring to FIG. 7, there will now be described the organic resin and polyisocyanate supply lines, the compressed air supply lines, and the solvent supply lines as connected to the automatic foam dispensing system 100 in accordance with the present invention. A source of organic resin 152 and polyisocyanate 154 is provided with a respective dispensing pump 156, 158. The dispensing pumps 156, 158 provide a continuous supply of organic resin and polyisocyanate to each dispensing apparatus 116 through organic resin supply lines 160 and through polyisocyanate supply lines 162. The liquid organic resin and polyisocyanate are mixed within a mixing chamber of each dispensing apparatus 116 for discharging polyurethane foamed material therefrom in a manner described in the above-noted patent application. A solvent supply tank 164 contains a source of solvent for the polyurethane foam such as Cellosolve solvent. The solvent is supplied to a nose cleaner assembly (not shown) attached to the tip of each dispensing apparatus 116 through solvent supply lines 166 and air control valves 168. One such nose cleaner assembly adapted for removing accumulations of polyurethane foam from the tip of the dispensing apparatus 116 is disclosed in U.S. patent application Ser. No. 241,013, filed on Mar. 6, 1981 and assigned to the same assignee of the present invention, which nose cleaner assembly is incorporated by reference herein. The arm assembly 118, each dispensing apparatus 116 and each pivot assembly 138 for operation of the projection assemblies 120, 122 are controlled by compressed gas, for example, air, supplied thereto through suitable air supply lines 169.

The mold assemblies 104, 106 will now be described with reference to FIGS. 8 and 1. Specifically referring to FIG. 8, there is disclosed a mold assembly 104 having a male mold 170 centrally located thereon. The male mold 170 is formed in the image of the shock-absorbing members to be formed inside the container. A plurality of guide plates 172 are secured about the male mold 172 and aid in directing the polyurethane foam as it expands within the container to fill the voids between the male mold and the container walls. The male mold 170 further includes a plurality of aperatures 174 communicating with a source of vacuum to be used in a manner to be described hereinafter with reference to the operation of the automatic foam dispensing system 100. Located on either side of the male mold 170 are a pair of end flap molds 176, 178 adapted to form the shock-absorbing members on the end flaps of the container if desired.

Pivotally secured adjacent the end flap molds 176, 178 are end flap securing assemblies 180, 182 constructed of a projection 184 pivotally attached to the mold assembly 104 by a pivot assembly 186. The pivot assembly 186 is constructed in a like manner previously described with respect to the pivot assembly 138 as illustrated in FIGS. 5 and 6. Each mold assembly 104, 106 is provided on a wheeled support 188 which smoothly moves along the track assembly 108. As illustrated in FIG. 1, a plurality of mold assemblies 104, 106 may be removably secured to each other in end-to-end relationship by a coupling mechanism (not shown) located within the housing 190.

The operation of the automatic foam dispensing system 100 in forming shock-absorbing members of polyurethane foam into predetermined shapes at preselected locations inside a container for the cushioning of an article provided therein will now be described generally with reference to FIGS. 8-15. Specifically referring to FIG. 8, the mold assembly 104 is positioned on the track assembly 108 in a first position on either side of the dispensing booth 102 (see FIG. 1). Initially, the compressed air supply is activated causing the pivot assemblies 186 to open the end flap securing assemblies 180, 182 to expose the end flap molds 176, 178. In addition, a vacuum source is activated to communicate a source thereof to the aperatures 174 provided in the male mold 170.

A shown in FIG. 9, a plastic sheet 192 of suitable material such as polyethylene film is draped over the male mold 170 and end flap molds 176, 178. The plastic sheet 192 is optionally provided to protect the male mold 170 and the end flap molds 176, 178 from the corrosive action of the polyurethane foam and to prevent its adhering thereto. In this regard, the plastic sheet 192 may be eliminated where the male mold 170 and end flap molds 176, 178 are constructed from such materials as known to those skilled in the art which would withstand the corrosive and adhering action of the polyurethane foam. As illustrated, the action of the vacuum created within the aperatures 174 causes the plastic sheet 192 to adhere to and conform about the male mold 170 and end flap molds 176, 178.

A container 194 having an open top and bottom is placed over the male mold 170 on the mold assembly 104 such that the end flaps 196 are disposed over the end flap molds 176, 178. As described, the mold assembly 104 is located on the track assembly 108 in a first position adjacent either side of the dispensing booth 102. As the mold assembly 104 is moved along the track assembly 108 by suitable moving means (not shown), i.e., electric motor connected to the wheels of the wheeled support 188, the pivot assemblies 186 are activated to cause the end flap securing assemblies 180, 182 to pivot into a position overlying the end flap molds 176, 178 in a manner to engage the end flaps 196 of the container 194 so as to secure the container to the mold assembly as shown in FIG. 10.

Figure 11:
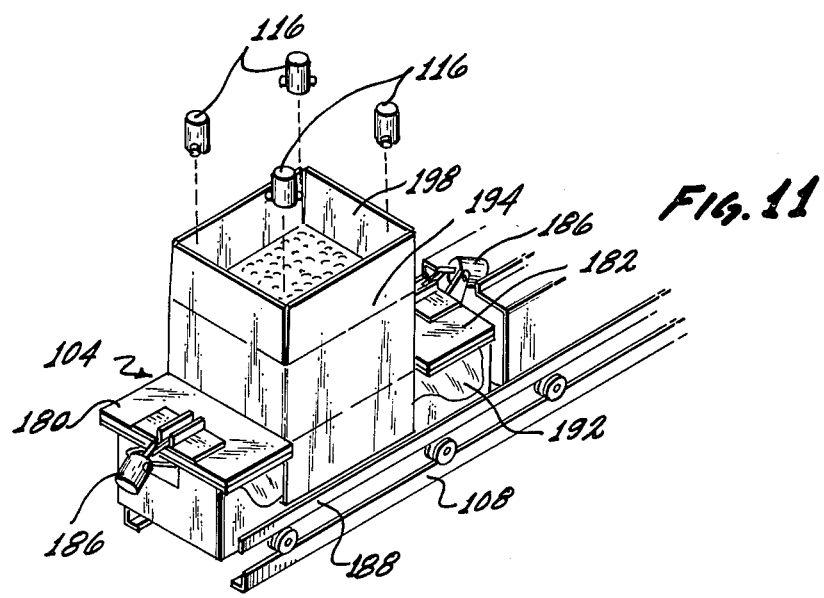

A trip switch (not shown) signals that the mold assembly 104 is located in a second position within the dispensing booth 102 underlying the dispensing apparatus 116 as shown in FIG. 11. As such, the trip switch initiates the dispensing of polyurethane foam from the dispensing apparatus 116 through the bottom opening of the container 194 at the four adjacent corners thereof. As noted, each dispensing apparatus 116 is fixedly secured to the frame 110. However, the dispensing apparatus 116 may be mounted to the frame 110 in a manner which allows movement of the dispensing apparatus over a portion of the container 194 in a programmed manner. Upon completion of the dispensing cycle, i.e., when the container 194 has been filled to a predetermined level such as three-quarters of the volume of the voids therein, each of the dispensing apparatus 116 are deactivated and a small quantity of solvent for the polyurethane foam is dispensed from the solvent supply tank 164 to the nose cleaner assembly (not shown) in a manner described in the last-mentioned U.S. patent application.

Figure 12:
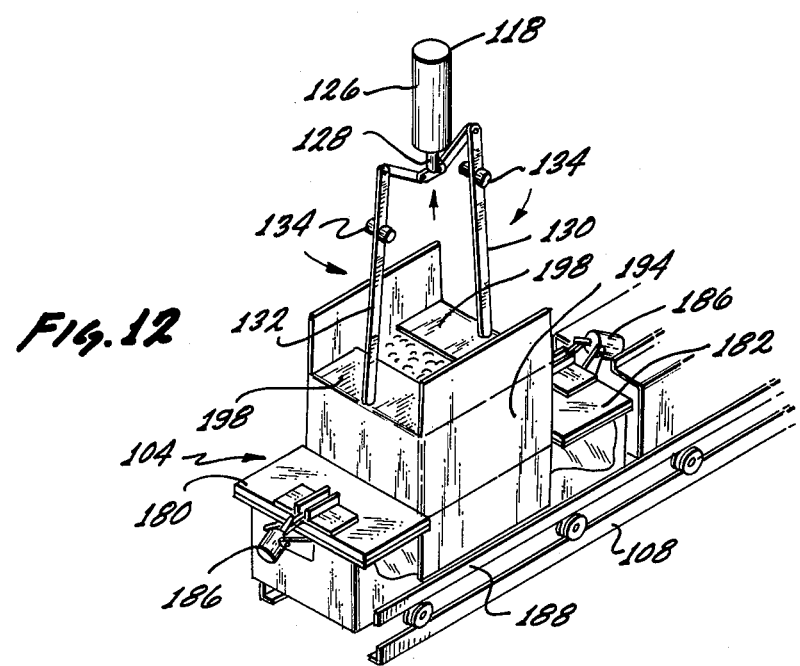

Referring to FIG. 12, once the dispensing cycle has been terminated, the arm assembly 118 is activated causing the piston rod 128 to be withdrawn upwardly by the fluid cylinder 126. In this manner, the arms 130, 132 are pivoted about the pivot bearings 134 such that their distal ends engage a portion of the end flaps 198 along the bottom of the container 194. The engagement of the arms 130, 132 with the end flaps 198 cause the end flaps to fold inwardly overlying the opening of the container 194 and partially closing same. In a reverse manner, the outward movement of the piston rod 128 via action of the fluid cylinder 126 causes the arms 130, 132 to pivot upwardly into their original position.

As shown in FIG. 13, as the arms 130, 132 of the arm assembly 118 are pivoted into their original position, the projection assemblies 120, 122 are pivoted by the pivot assemblies 138 such that the projections 136 engage the side flaps 200 on the bottom of the container 194 in a manner to close same overlying the end flaps 198. The side flaps 200 are maintained in a closed position by the projection assemblies 120, 122 for a sufficient time to allow the polyurethane foam to completely rise within the container 194. Upon completion of the polyurethane foam rise time, the projection assemblies 120, 122 are returned to their original position in a reverse operating manner and the mold assembly 104 is moved along the track assembly 108 from its second position within the dispensing booth 102 to a first position adjacent either side of the dispensing booth.

As shown in FIG. 14, the mold assembly 104 has been moved from a second position within the dispensing booth 102 to a first original position adjacent thereto. As the mold assembly 104 is so moved, the end flap securing assemblies 180, 182 are pivoted by the pivot assemblies 186 from engagement with the end flaps 196 of the container 194 in the manner previously described with respect to their operation. At this time, the process operator may seal the bottom of the container 194 closed using suitable tape. Once the mold assembly 104 has returned to a first position, a container removal assembly 202 located within the mold assembly is activated. The container removal assembly 202 is constructed from a fluid cylinder 204 having a piston rod 206 movably secured therein and having its distal end attached to a push block 208. As the fluid cylinder 204 is activated, the piston rod 206 causes the push block 208 to urge upward against the bottom of the now sealed container 194 in a manner to remove the container from the mold assembly 104. In this regard, the process operator may now manually lift the container 194 from the mold assembly 104 so as to repeat the above-described operation of the automatic foam dispensing system without interruption.

As shown in FIG. 15, a container 194 having a plurality of shock-absorbing members 210 of polyurethane foam formed into predetermined shapes at pre-selected locations inside the container for cushioning of an article to be provided therein is formed by operation of the automatic foam dispensing system 100 of the present invention. As such, the automatic foam dispensing system 100 has been described as being constructed from a mold assembly having a mold for forming the polyurethane foam into the predetermined shapes at the pre-selected locations, wherein the mold assembly is adapted to be movable between a first and second position and to securely receive thereon the container having an open top and bottom.

Further, the automatic foam dispensing system is constructed to include means for moving the mold assembly having the container secured thereon between the first and second positions, means at the second position for dispensing the polyurethane foam into the container surrounding the mold through the open bottom when the mold assembly is in the second position, means at the second position for sequentially closing the end and side flaps on the bottom of the container, and means within the mold assembly for separating the container from the mold when the mold assembly is in the first position wherein the container has formed on the inside thereof at the pre-selected locations the shock-absorbing members of the predetermined shapes. The automatic foam dispensing system 100 is operated in timed sequence using a programmed controller 212 (FIG. 1) of the type known to those skilled in the art.

As thus far described, the automatic foam dispensing system 100 has been described to include a pair of mold assemblies 104, 106 removably secured to each other in end-to-end relationship for movement along a generally linear track assembly 108 between a first and second position. It is noted that the first position is considered to be generally that location of the mold assembly 104, 106 on either side of the dispensing booth 102 and the second position being that position where the mold assembly is within the dispensing booth. For example, where two mold assemblies 104, 106 are used, one mold assembly 104 is shuttled back and forth between a first position adjacent the left side of the dispensing booth 102 and a second position within the dispensing booth while the other mold assembly 106 is shuttled back and forth to the right side of the dispensing booth. Further in accordance with the present invention, it is contemplated that the substantially linear track 108 may be replaced by a circular closed or convoluted track of any design which would thereby provide for the use of a plurality of mold assemblies 104, 106 removably secured to each other in end-to-end relationship. Further, the convoluted track may include a plurality of dispensing booths 102 intermittently provided therealong.

The present invention as thus described provides an automatic foam dispensing system which eliminates the need for a process operator to manually dispense the polyurethane foam from a dispensing apparatus into the container along with its associated advantages, which system can be operated at increased speed while maintaining quality control of the shock-absorbing members formed within the container, which system prevents the inadvertent overfilling of the container and its associated disadvantages, and which system is economical to use in a fast and efficient manner. Although the invention herein has been described with reference to particular embodiments, it is to be understood that these embodiments are merely illustrative of the principals and application of the present invention. It is to be understood that numerous modifications may be made in the illustrative embodiments and other arrangements may be devised without departing from the spirit and scope of the present invention as defined by the appended claims.

What is claimed is:

1. A system for forming shock-absorbing members of cushioning material inside a container for the cushioning of an article to be provided therein, said system comprising a booth, a mold assembly movable between a first position outside of said booth and a second position within said booth, said mold assembly having means for supporting a container having an opening therein, dispensing means within said booth at said second position for dispensing said cushioning material into said container through said opening when said mold assembly is positioned within said booth underlying said dispensing means, and means for moving said mold assembly between said first and second positions while said dispensing means remains at said second position for dispensing said cushioning material into an incoming underlying container wherein said container has formed therein said shock-absorbing members of said cushioning material.

2. The system as set forth in claim 1 wherein said means for moving said mold assembly between said first and second position is constructed and arranged for movement of said mold assembly along a substantially linear path.

3. The system as set forth in claim 1 wherein said means for moving said mold assembly between said first and second position is constructed and arranged for movement of said mold assembly along a substantially closed path.

4. The system as set forth in claim 1 further including a plurality of booths provided at a plurality of second positions.

5. The system as set forth in claim 1 further including a plurality of mold assemblies removably secured to each other in end-to-end relationship.

6. The system as set forth in claim 1 wherein said dispensing means is movably positioned at said second position for movement while dispensing cushioning material therefrom.

7. The system as set forth in claim 1 wherein said mold assembly includes a mold for forming said cushioning material into predetermined shapes at pre-selected locations inside said container.

8. A system for forming shock-absorbing members of foamed material into predetermined shapes at pre-selected locations inside a container for the cushioning of an article to be provided therein, said system comprising a booth, a mold assembly having a mold for forming said foamed material into said predetermined shapes at said pre-selected locations, said mold assembly adapted to be movable between a first position outside of said booth and a second position within said booth and to securely receive thereon a container having an open top and bottom, dispensing means within said booth at said second position for dispensing said foamed material into said container surrounding said mold through said open bottom when said mold assembly is positioned within said booth underlying said dispensing means, means for moving said mold assembly having said container secured thereon between said first and second positions while said dispensing means remains at said second position for dispensing said cushioning material into an incoming underlying container, means at said second position for sequentially closing the end and side flaps on the bottom of said container, and means within said mold assembly for separating said container from said mold when said mold assembly is in said first position, wherein said container has formed on the inside thereof at said pre-selected locations said shock-absorbing members of said predetermined shapes.

9. The system as set forth in claim 8 wherein said means for closing the end flaps on the bottom of said container comprises a pair of arms pivotally arranged at said second position for engagement with said end flaps for closure thereof.

10. The system as set forth in claim 8 wherein said means for closing the side flaps on the bottom of said container comprises a pair of projections pivotally arranged on opposite sides of said second position for engagement with said side flaps for closure thereof.

11. The system as set forth in claim 8 wherein said separating means comprises a fluid cylinder having one end attached to the top portion of said mold for movement thereof in an upward direction away from the remaining portion of said mold for causing separation of said container from said mold for removal thereof.

12. The system as set forth in claim 8 wherein the operation of said system is in timed sequence by a programmed controller.

13. The system as set forth in claim 8 further including means for supplying sheet material to be positioned about the outside of said mold to prevent said foamed material from adhering thereto.

14. The system as set forth in claim 8 wherein said means for moving said mold assembly between said first and second position is constructed and arranged for movement of said mold assembly along a substantially closed path.

15. The system as set forth in claim 8 further including a plurality of mold assemblies removably secured to each other in end-to-end relationship.

16. The system as set forth in claim 1 further including means at said second position for closing said opening of said container.

* * * * *